United States Patent Office 2,743,482
Patented May 1, 1956

2,743,482

RUBBER HYDROCHLORIDE FILM

George W. Ferner, Cuyahoga Falls, Ohio, assignor, by mesne assignments, to The Goodyear Tire & Rubber Company, a corporation of Ohio No Drawing. Application February 20, 1953,
Serial No. 338,147

3 Claims. (Cl. 18—47.5)

This invention relates to stretched rubber hydrochloride film which contains a dialkyl ether which is solid at the temperature at which the film is to be used. The dialkyl ether increases the resistance of the film to the passage of water vapor.

Much of the rubber hydrochloride film of commerce has been stretched to increase its tensile strength or to otherwise improve its physical properties, such as resistance to tear, etc. Some film is stretched lengthwise only; other film is stretched both lengthwise and widthwise.

The solubility of the dialkyl ethers in rubber hydrochloride is limited. It is not uncommon for materials dissolved in cast rubber hydrochloride to be thrown out of solution in the film when the film is stretched, and to bloom to the surface. Dialkyl ethers do not follow this general rule, but are more soluble in the stretched film than unstretched film, i. e. cast film. In fact, a bloom of dialkyl ether on unstretched rubber hydrochloride film will dissolve into the film when the film is stretched or molecularly oriented.

The physical properties of cast rubber hydrochloride film are improved by stretching the film two or three hundred per cent. Ordinarily a stretched film will be stretched to at least four hundred per cent of its unstretched area in order to produce a substantial improvement in its physical properties, and the invention will be described as though four-fold stretching is a minimum. Film stretched sufficiently to produce a substantial improvement in its physical properties but less than four hundred per cent of its original area will be considered the equivalent of film stretched at least four hundred per cent. Rubber hydrochloride film is often stretched to eight or ten hundred per cent, and may be stretched as much as about sixteen hundred per cent.

It is customary to add a plasticizer to film which is to be stretched. Several per cent of plasticizer improves the stretchability of the film. Plasticizers are soluble to only a limited amount in rubber hydrochloride film, and are more soluble in unstretched film than in stretched film. According to this invention there is preferably incorporated in rubber hydrochloride film which is to be stretched, several per cent, and usually about five per cent of a mixed plasticizer, a portion of the plasticizer being an improver of a physical property of the film, and another portion of the plasticizer being a compatibilizer for the ether, making it more soluble in the film. The portions of the mixed plasticizer will ordinarily be used in equal parts, but the ratio may be varied from 1:2 to 2:1 or over an even greater range.

The plasticizers which are property improvers include such compounds as dibutyl phthalate, esters of hydrogenated abietic acid such as the dihydro methyl abietate known as Hercolyn D; a phosphate such as tritolyl-, ethyl diphenyl-, dibutylphenyl-, etc. phosphates, including 2-ethylhexyl-diphenyl phosphate known commercially as Santicizer 141; and alkoxy-alkyl phosphates such as trimethoxymethyl-, trimethoxyethyl-, tripropoxybutyl-, etc. phosphates, including the tributoxyethyl phosphate known as KP140; a dialkyl ester of a higher molecular weight aliphatic dicarboxylic acid, for example a dialkyl adipate or a dialkyl sebacate, etc. such as diisobutyl adipate, octyldecyl adipate, dioctadecyl adipate, diisooctyl adipate, and di(2-ethylhexyl) adipate known commercially as Adipol 2EH, dipropyl sebacate, dibutyl sebacate, etc. The foregoing are illustrative.

Ether compatibilizers include preferably such compounds as a hydrogenated terphenyl, which may be a solid such as Santowax O or a liquid such as HB-40; chlorinated paraffin such as that which contains at least sixty per cent chlorine, for example Chlorowax 70 which contains seventy per cent of chlorine; an alkoxyalkyl phosphate such as KP140 or any of the foregoing, dibutyl phthalate, a hydrogenated abietate such as Hercolyn D, and coumarone, indene or coumarone-indene resins of different softening points such as that known as Cumar P25, etc.

The dialkyl ether must be solid at the temperature at which the film is to be used in order to give the desired low water-vapor transfer rate. An ether which is liquid at room temperature might be used in film to be used at low temperatures, as for packaging frozen foods. However, ordinarily it will not be desirable to make a special film for such use, and an ether which is solid at room temperature will be employed because such film can be used for packaging at low temperatures as well as at room temperature. Such ethers are didodecyl ether with a melting point of 33° C. and ethers of longer chain length such as ditetradecyl ether, dioctadecyl ether, etc. including those of twenty and more carbon atoms in each alkyl group. Mixed ethers may be used as well as simple ethers. The alkyl groups may be straight chain or branched chain. Non-permanent ethers such as diethyl ether will not ordinarily be used.

The effect of the ether is illustrated by the results of the following experiment, in which all water-vapor transmission rates (W. V. T. R.) are converted to values for films .00090 inch thick, for ready comparison with one another. The following formulations were prepared (the figures representing parts by weight), films .0250 inch thick were cast from them, and the W. V. T. R. determined for each by a standard procedure which measured the amount of water-vapor transmitted through the film with a relative humidity differential of 90 to 95 per cent between the two sides of the film. The determinations were made at 100° F., and recorded as gm./100 sq. in./24 hours. Two determinations were made for each formulation, and the value for film .00090 inch thick calculated and recorded in the table:

|  | Blank | Film #2 | Film #3 | Film #4 | Film #5 |
|---|---|---|---|---|---|
| Formulation: |  |  |  |  |  |
| Rubber hydrochloride | 100 | 100 | 100 | 100 | 100 |
| HB-40 | 2.5 | 2.5 | 2.5 | 2.5 | 2.5 |
| Hercolyn D | 2.5 | 2.5 | 2.5 | 2.5 | 2.5 |
| Dioctadecyl ether |  | 1.0 | 2.0 | 5.0 | 0.25 |
| W. V. T. R. Values | .901 / .947 | .670 / .665 | .536 / .557 | .548 / .496 | .888 / .959 |

The dialkyl ether materially reduced the rate of water-vapor transfer through the film. In unstretched film, over 1 or 1.5 per cent of ether does not give any substantial improvement in W. V. T. R. over that obtained with up to 1 or 1.5 per cent. All ether over the effective amount is undissolved in the film and forms an objectionable bloom. Although the above cast films containing 2.0 to 5.0 parts of ether had an objectionable surface bloom, this bloom disappeared when the films were stretched by the procedure described below.

Combinations of the foregoing cast films were laminated in a press at 225° F. and 22,000 pounds pressure for one minute. After preheating the laminates in an oven for one minute at 210° F., the films were stretched at 180° F. in perpendicular directions to ten times their original areas. The different laminations made are indicated in the following table, the numbers under the different ply headings referring to the amounts of dioctadecyl ether in the respective plies as shown in the foregoing formulations. The W. V. T. R. values determined for the different laminations, are recorded, together with their averages.

| Parts Dialkyl Ether | | | W. V. T. R. at 100° F. in gms./100 sq. in./24 hrs. | |
|---|---|---|---|---|
| 1st Ply | 2nd Ply | 3rd Ply | | Ave. |
| 0 | 0 | 0 | 1.26; 1.30 | 1.28 |
| 0 | 0.25 | 0 | 1.32; 1.21 | 1.27 |
| 0 | 1 | 0 | 1.29; ---- | 1.29 |
| 0 | 2 | 0 | 1.14; 1.20 | 1.17 |
| 0.25 | 0.25 | 0.25 | 1.14; 1.17 | 1.16 |
| 0.25 | 1 | 0.25 | 1.08; 1.15 | 1.12 |
| 0 | 5 | 0 | 1.08; 1.13 | 1.11 |
| 0.25 | 2 | 0.25 | 1.01; 1.20 | 1.10 |
| 1 | 2 | 1 | 1.07; 1.08 | 1.07 |
| 1 | 1 | 1 | 1.04; 0.96 | 1.00 |
| 0.25 | 5 | 0.25 | 0.99; 0.98 | 0.98 |
| 2 | 2 | 2 | 0.94; 0.89 | 0.92 |
| 1 | 5 | 1 | 0.86; 0.91 | 0.89 |
| 2 | 5 | 2 | 0.71; 0.79 | 0.75 |
| 5 | 5 | 5 | 0.44; 0.38 | 0.41 |

Although the use of over one and one-half per cent of ether in unstretched film gave no substantial improvement in water-vapor resistance, the foregoing shows that it is advantageous to use over one per cent in stretched film. Generally three to five per cent of ether has been found advantageous.

For comparison we record the W. V. T. R. values for rubber hydrochloride film, both unstretched and stretched in perpendicular directions, containing different amounts of butyl stearate, the plasticizer most widely used in rubber hydrochloride film. The W. V. T. R. values are figured for film .00090 inch thick:

| Percent Butyl Stearate | | W. V. T. R. |
|---|---|---|
| 0.0 | unstretched | 0.64 |
| 0.0 | two-way stretched | 1.30 |
| 3.75 | unstretched | 1.05 |
| 3.75 | two-way stretched | 1.69 |
| 5.0 | unstretched | 1.13 |
| 5.0 | two-way stretched | 1.49 |

It is noted that the addition of the dialkyl ether in amounts of 3 to 5 per cent to stretched film gave W. V. T. R. values substantially as good or better than that of unplasticized unstretched rubber hydrochloride film. The foregoing also shows that rubber hydrochloride film containing butyl stearate loses resistance to the passage of water-vapor transfer on stretching.

In a further experiment, likewise, all W. V. T. R. were calculated on the basis of film .00090 inch thick. Film was prepared as follows:

Parts by weight
Rubber hydrochloride _____ 100.
HB-40 _____ 2.5
Hercolyn D _____ 2.5
Dioctadecyl ether _____ 5.0

Determinations of W. V. T. R. were made by the same standard procedure on cast unstretched film and film which had been stretched about eight fold, and calculated for film .00090 inch thick, as follows:

| | Unstretched Film | Stretched Film |
|---|---|---|
| W. V. T. R. | 0.87 | 0.50 |
| W. V. T. R. | 0.87 | 0.42 |
| W. V. T. R. | ---- | 0.48 |
| Ave. W. V. T. R. | 0.87 | 0.47 |
| Area Stretch | None | 1:8.43 |

It is clear from the foregoing that in the stretched film the ether produces greater resistance to the passage of water vapor than in the cast or unstretched film.

Although commercially only plasticized films are stretched, unplasticized film containing dioctadecyl ether was stretched to determine its effect on the film. Films were compounded as follows, and tested with the results given. The stretched film was stretched to 10 times its original area.

| | | |
|---|---|---|
| Rubber hydrochloride _____ parts | 100 | 100 |
| Dioctadecyl ether _____ do | 0 | 5 |
| W. V. T. R.: | | |
| Unstretched | 0.89 | 0.62 |
| Stretched | 0.87 | 0.67 |

The dialkyl ethers are less soluble in the unstretched or cast film than in the stretched film. When the cast film contains any more than 1.0 or 1.5 per cent of ether, the excess blooms to the surface. Cast film containing 3 to 5 per cent of ether becomes nearly opaque within a few days after casting due to the ether bloom. When such film is stretched, the bloom disappears entirely, or substantially entirely, by solution of the ether into the stretched film. Thus, more ether can be dissolved into stretched film than into unstretched film, and the resistance of the stretched film to the passage of moisture vapor is thereby increased. This is true whether or not the film contains any plasticizer, although plasticized film is ordinarily preferred because the stretched unplasticized film is harsh and too stiff for ordinary packaging operations.

What I claim is:

1. The method of dissolving solid dialkyl ether into rubber hydrochloride film which comprises casting rubber hydrochloride film which contains the dialkyl ether dispersed therein in an amount in excess of that soluble in the cast film, allowing the dialkyl ether to bloom to the surface of the film, and then stretching the film and thereby dissolving the bloomed ether into the rubber hydrochloride composition of the film.

2. Molecularly oriented rubber hydrochloride film which contains 3 to 5 per cent (based on the rubber hydrochloride) of a dialkyl ether which is solid at room temperature; and also a plasticizer from the class consisting of dibutyl phthalate, ester of hydrogenated abietic acid, alkylaryl phosphates, and dialkyl esters of aliphatic dicarboxylic acids containing at least 6 carbon atoms in the aliphatic chain; and an ether compatibilizer of the class consisting of hydrogenated terphenyls, chlorinated paraffin, alkoxyalkyl phosphates, dibutyl phthalate, hydrogenated abietate, and coumarone, indene and coumarone-indene resins.

3. Rubber hydrochloride film which is molecularly oriented and contains dissolved therein over one per cent of solid dialkyl ether and more than is soluble in the un-oriented rubber hydrochloride.

References Cited in the file of this patent

UNITED STATES PATENTS 2,356,948     Reed _____ Aug. 29, 1944